United States Patent
Colbert

(10) Patent No.: US 10,221,541 B1
(45) Date of Patent: Mar. 5, 2019

(54) TELESCOPING OUTRIGGER SYSTEMS

(71) Applicant: Joshua Colbert, Chandler, AZ (US)

(72) Inventor: Joshua Colbert, Chandler, AZ (US)

( * ) Notice: Subject to any disclaimer, the term of this patent is extended or adjusted under 35 U.S.C. 154(b) by 0 days.

(21) Appl. No.: 15/430,618

(22) Filed: Feb. 13, 2017

Related U.S. Application Data

(63) Continuation of application No. 13/684,127, filed on Nov. 21, 2012, now Pat. No. 9,567,728.

(51) Int. Cl.
| | |
|---|---|
| *E02F 9/00* | (2006.01) |
| *E02F 9/08* | (2006.01) |
| *B60S 9/12* | (2006.01) |
| *E02F 3/32* | (2006.01) |
| *E02F 3/96* | (2006.01) |

(52) U.S. Cl.
CPC ............... *E02F 9/085* (2013.01); *B60S 9/12* (2013.01); *E02F 3/32* (2013.01); *E02F 3/964* (2013.01)

(58) Field of Classification Search
CPC .. E02F 9/085; E02F 3/32; E02F 3/964; B66C 23/80; B66C 23/701; B66C 13/40; B66C 19/102
See application file for complete search history.

(56) References Cited

U.S. PATENT DOCUMENTS

| | | | | |
|---|---|---|---|---|
| 2,452,632 A | * | 11/1948 | McLeod | B62D 57/00 180/8.1 |
| 3,279,622 A | * | 10/1966 | Person | B66C 23/80 212/304 |
| 4,395,191 A | | 7/1983 | Kaiser | |
| 4,416,344 A | * | 11/1983 | Nakada | B66C 23/80 180/199 |
| 4,689,903 A | | 9/1987 | Gilbert | |
| 4,706,825 A | * | 11/1987 | Johnson | B66C 19/02 212/294 |

(Continued)

FOREIGN PATENT DOCUMENTS

WO    WO8502361 A1    6/1985

OTHER PUBLICATIONS

Ernst Menzi, Walking Excavators and Mobility, Unusual Off-Road Locomotion, Sep. 2010, Published at http://www.unusuallocomotion.com/pages/locomotion/walking.html.

*Primary Examiner* — Hau V Phan
(74) *Attorney, Agent, or Firm* — Wayne Carroll; Inspired Idea Solutions Law Firm

(57) ABSTRACT

A system to stabilize a construction vehicle is disclosed having a frame and a pair of stabilizing legs with ground-engaging shoes at the ends of the legs. The stabilizing legs may pivotally connect to the frame on substantially opposing sides, so that the stabilizing legs pivot upwards to a stowed position and pivot downwards to a stabilizing position where the shoe engages the ground. The stabilizing legs may telescope between a retracted and extended position. The retracted position locates the shoe closer to the vehicle and the extended position further from the vehicle. A pair of hydraulic cylinders may be connected to the respective stabilizing legs to power the telescopic movement of the stabilizing legs between the retracted position and extended position. A controller may allow substantially lateral movement of the construction vehicle while the pair of stabilizing legs are engaged with the ground to support the construction vehicle.

19 Claims, 7 Drawing Sheets

(56) References Cited

U.S. PATENT DOCUMENTS

| | | | | |
|---|---|---|---|---|
| 5,265,995 A * | 11/1993 | Beck | ........................ | E02F 3/964 |
| | | | | 180/331 |
| 5,688,100 A * | 11/1997 | Wunder | ................. | B60P 1/6472 |
| | | | | 414/547 |
| 5,711,440 A * | 1/1998 | Wada | ..................... | B66C 23/905 |
| | | | | 212/231 |
| 6,092,975 A * | 7/2000 | Cannon, Jr. | .............. | B66C 23/80 |
| | | | | 212/302 |
| 6,202,013 B1 * | 3/2001 | Anderson | ................ | B66C 13/40 |
| | | | | 701/50 |
| 6,565,307 B1 * | 5/2003 | Niemela | ................ | B60P 1/6472 |
| | | | | 212/264 |
| 7,683,564 B2 * | 3/2010 | Harris | ..................... | B66C 23/80 |
| | | | | 318/565 |
| 9,567,728 B2 * | 2/2017 | Colbert | ................... | E02F 9/085 |
| 2001/0002086 A1 * | 5/2001 | Webb | ...................... | B66C 23/80 |
| | | | | 280/765.1 |
| 2008/0038106 A1 * | 2/2008 | Spain | .................... | B66C 23/701 |
| | | | | 414/563 |
| 2012/0261213 A1 * | 10/2012 | St-Yves | ..................... | B60S 9/12 |
| | | | | 182/64.1 |

* cited by examiner

TELESCOPING OUTRIGGER SYSTEMS

CROSS REFERENCE TO RELATED APPLICATIONS

This application is related to, and claims priority to, U.S. application Ser. No. 13/684,127 filed on Nov. 21, 2012, issued as U.S. Pat. No. 9,567,728 on Feb. 14, 2017, the contents of which are hereby incorporated by reference.

BACKGROUND

1. Technical Field

This disclosure relates to vehicles for excavating and particularly backhoes.

BRIEF SUMMARY

A system is disclosed for providing a range of ground positions to position the shoe of an outrigger so that the operator of the construction equipment can select the preferred ground position. This disclosed system may provide lateral movement of construction equipment where the outriggers are in the stabilizing position. The disclosed system may be safe, efficient, trustworthy, inexpensive and handy.

Disclosed is a system to stabilize a construction vehicle having a frame and a pair of stabilizing legs with ground-engaging shoes at the distal ends of the legs. The stabilizing legs may pivotally connect to the frame on substantially opposing sides, so that the stabilizing legs pivot upwards to a stowed position and pivot downwards to a stabilizing position where the shoe engages the ground. Further, the stabilizing legs may telescope between a retracted position and an extended position. The retracted position may locate the shoe closer to the vehicle and the extended position may locate the shoe further from the vehicle. A pair of hydraulic cylinders may connect to the respective stabilizing legs to power the telescopic movement of the stabilizing legs between the retracted position and extended position.

DETAILED DESCRIPTION

The disclosed telescoping outrigger systems will now be discussed in detail with regard to the attached drawing figures, which were briefly described above. In the following description, numerous specific details are set forth illustrating the Applicant's best mode for practicing the telescoping outrigger systems and enabling one of ordinary skill in the art to make and use the telescoping outrigger systems. It will be obvious, however, to one skilled in the art that the disclosed telescoping outrigger systems may be practiced without many of these specific details. In other instances, well-known manufacturing methods, mechanical engineering considerations, hydraulic circuit considerations, fluid dynamics principals and other details have not been described in particular detail in order to avoid unnecessarily obscuring this disclosure.

Figure 1:
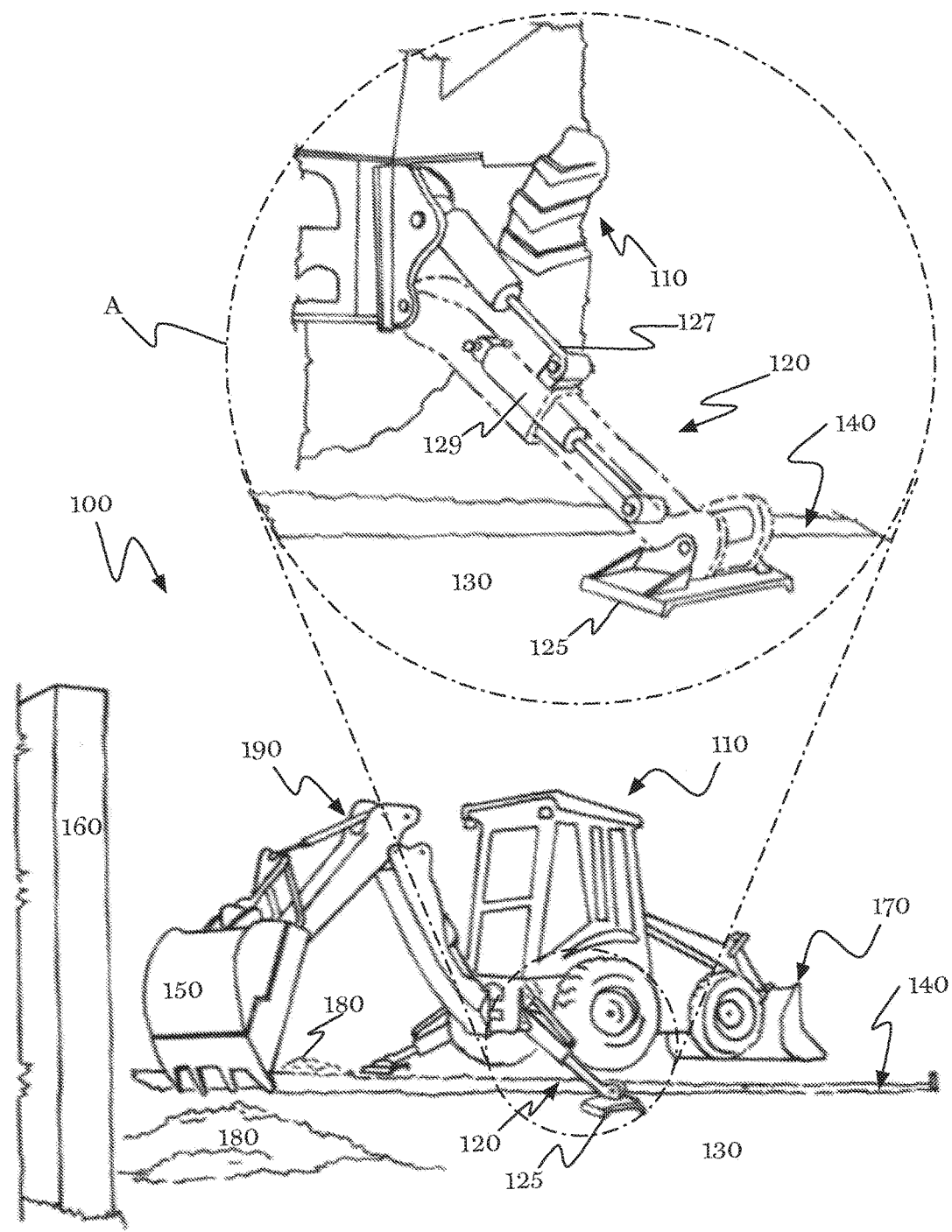
FIG. 1 shows a perspective view that illustrates a backhoe loader with an outrigger engaged with the ground after being extended to a location further from the vehicle.

FIG. 1 shows a perspective view that illustrates backhoe loader 110 with outrigger 120 that may include a stabilization leg engaged with ground 130 after being extended to a location further from backhoe loader 110 across ditch 140. System 100 shows how outriggers on backhoe loaders can extend and retract hydraulically. That is, system 100 shows how outriggers can telescope their length to provide positioning of shoe 125 across a range of ground locations to permit the operator to place shoe 125 on stable ground. Hydraulically telescoping outriggers can be helpful when shoe 125 would otherwise be positioned inside or along the edge of the ditch that the backhoe loader digs.

For example, as shown in FIG. 1, backhoe loader 110 uses the bucket 150 to dig a ditch 140 in the ground 130 between building 160 and a terminus, (which is not shown), such as the street, or utility connection. It is desirable to dig ditch 140 to extend close to both building 160 and the terminus using backhoe loader 110 (and not digging manually, for example, using shovels). One way to dig ditch 140 using backhoe loader 110 would be to begin digging at the terminus and proceed toward building 160. As the ditch approaches building 160, backhoe loader 110 would be turned around to complete the ditch (and to avoid running into the building) by digging outwardly from the building back toward the ditch 140.

Without telescoping outriggers, backhoe loader would likely place the outrigger inside the ditch (that is, not properly engaged with ground), or, immediately next to the ditch where the ground may not be stable. Without telescoping outriggers, the backhoe loader operator might need to re-position or repeatedly re-position the backhoe loader to avoid an undesirable placement of the outrigger shoe.

Without the telescoping outriggers, the backhoe loader might be required to refill a portion of the ditch in order to effectuate a stable placement of the outrigger.

As shown, backhoe loader 110 could avoid these problems. Backhoe loader 110 shows outrigger 120 extended beyond ditch 140 to place shoe 125 beyond ditch 140. Without extending, outrigger 120 might be placed in ditch 140. This shoe 125 placement relieves the need to reposition backhoe loader 110, which may improve efficiency, for example, because the time spent repositioning the backhoe loader could be saved. This shoe 125 placement relieves the need to partially fill in ditch 140, which may save time and improve safety, for example, because the time spent partially filling in the ditch could be saved and because more stable ground could be selected for placement of the shoe of the outrigger.

By allowing a wider range of placements of the shoe 125, safety can be improved, for example, because a more stable location for placing the shoe 125 may be selected by the operator. The telescoping outrigger maintains many of the existing benefits of backhoe outriggers generally. For example, the outriggers can still be stowed for easy transportation of the backhoe rigger.

Further, when the backhoe loader is used on uneven ground, the use of telescoping outriggers can provide additional positioning of the backhoe loader and placement of the shoe of the outrigger.

As shown in the exploded portion A of FIG. 1, the outrigger 120 can be telescoped (that is, extend or retract along a range of ground positions) and moved between stowed/stabilized positions using hydraulic cylinders. Hydraulic cylinder 127 moves outrigger 120 between a stowed position and a stabilizing position.

Hydraulic cylinder 129 is shown positioned inside outrigger 120. Hydraulic cylinder 129 extends or retracts the length of outrigger 120, because outrigger 120 has two mating portions that slide along the long axis.

Backhoe loader 110 has a bucket 150 for digging and excavating on one end. Backhoe loader 110 has a loader 170 on the other end for conveying materials into transportation trucks. Backhoe loader 110 prepares for excavation by lowering loader 170 and both of its outriggers 120, as shown, to stabilize the backhoe loader 110 while the bucket 150 moves, swings, and scoops during excavation. If necessary, outriggers 120 may be telescoped to select a desirable or stable ground position for shoe 125. Backhoe loader 110 excavates by swinging bucket 150 out to engage the ground by extending the stick and boom 190, and scooping up earth, which can be picked up and placed into piles of dirt 180, as shown.

The construction vehicle may be any suitable mechanical excavator with bucket and hinged boom, such as, the bucket loader (or front-end loader) shown in FIG. 1, for backhoe loader 110. Alternately, construction vehicle may be an excavator with features like removable buckets, removable loaders, etc. The stabilizing leg may be any suitable stabilizing beam such as rigger shown in FIG. 1, for outrigger 120. The frame may be any suitable vehicle chassis, such as the body of the backhoe loader shown in FIG. 1. The tractor may be any suitable prime mover, such as the engine enclosed in the backhoe loader shown in FIG. 1.

The backhoe bucket may be any suitable excavating-scoop such as the shovel-scoop shown in FIG. 1, for bucket 150. The loader bucket may be any suitable bucket conveyor for loading materials, such as the wide scoop shown in in FIG. 1 as loader 170. The shoe may be any suitable ground-engaging member, such as the friction gripper shown in FIG. 1 for shoe 125. The stick and boom may be any suitable hinged boom, such as the pivoting, two-beam hydraulically controlled boom shown in FIG. 1 as stick and boom 190.

The hydraulic cylinder may be any suitable linear hydraulic motor, such as the mechanical actuator that provides a unidirectional force with a unidirectional stroke, shown in FIG. 1 for hydraulic cylinder 127 and hydraulic cylinder 129.

Figure 2:
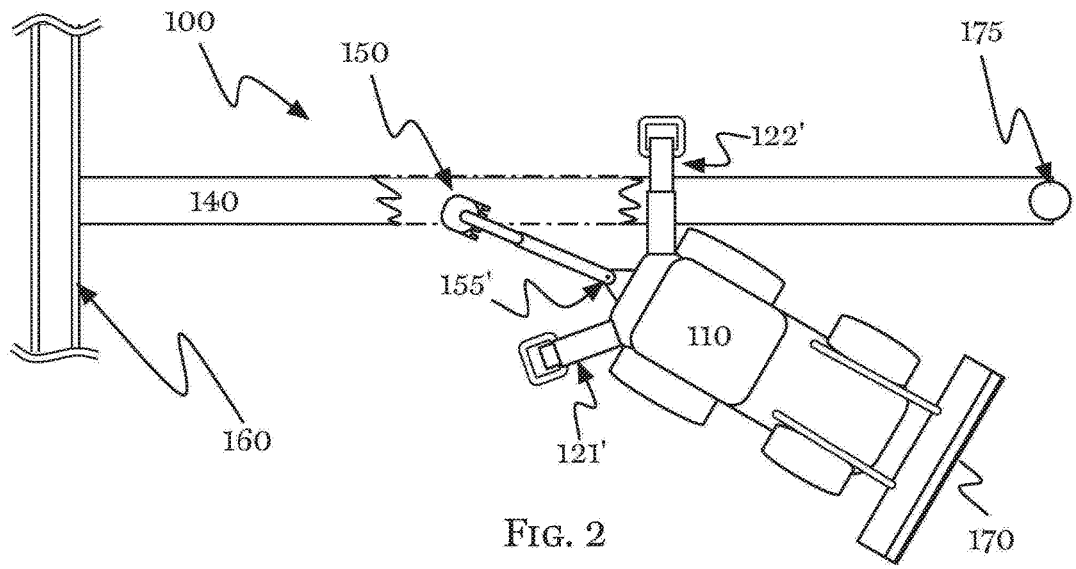
FIG. 2 shows a top, diagrammatic view that illustrates a backhoe loader positioned near a ditch requiring extension of an outrigger to cross the ditch.
Figure 3:
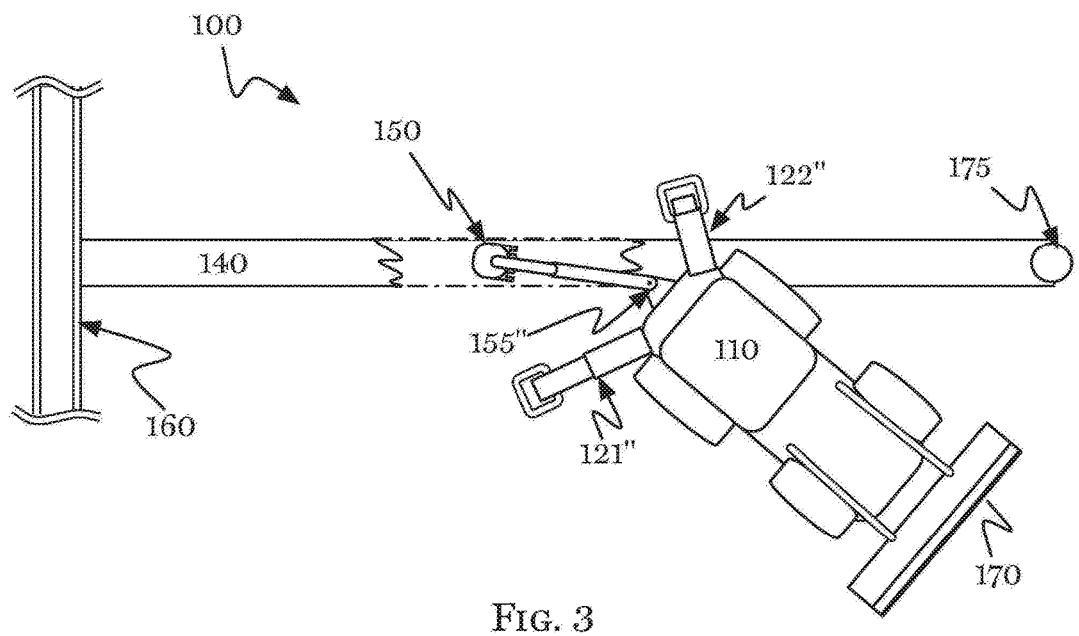
FIG. 3 shows a top, diagrammatic view that illustrates a backhoe loader positioned near a ditch after translating the backhoe over the ditch by retracting the extended outrigger and extending the retracted outrigger.

FIG. 2 shows a top, diagrammatic view that illustrates backhoe loader 110 positioned near ditch 140 requiring extension of an outrigger to cross ditch 140. FIG. 3 shows a top, diagrammatic view that illustrates backhoe loader 110 positioned near ditch after translating the backhoe over ditch 140 by retracting extended outrigger 122 and extending retracted outrigger 121.

Now turning to FIGS. 2 and 3 together, these figures show that the operator of backhoe loader 110 may translate backhoe loader 110 from side to side by simultaneously extending one outrigger and retracting the other outrigger, as shown. FIG. 2 shows outrigger 121' in the retracted position and outrigger 122' in the extended position. In both FIG. 2 and FIG. 3, loader 170 may be lowered to the ground position and is providing a third point of stabilization with the ground. This arrangement may be desirable because it would position the ground engaging end of outrigger 122 beyond ditch 140. Between the positions of the backhoe loader 110 shown in FIG. 2 and FIG. 3, operator would simultaneously extend outrigger 121 and retract outrigger 122. FIG. 3 shows the outrigger 121" in the extended position and outrigger 122" in the retracted position.

The result of the translation of the construction vehicle from the position shown in FIG. 2 to the position shown in FIG. 3 is that backhoe loader has moved predominately sideways, which can be seen by the movement of pivot 155 relative to ditch 140. Bucket 150 is attached to the stick and boom which is attached to backhoe loader 110 at pivot 155. Pivot 155 allows bucket 150 to swing from side to side. In FIG. 2, pivot 155' is positioned well to one side of ditch 140, as shown. In FIG. 3, pivot 155" is positioned substantially over top of ditch 140, as shown. Further, FIG. 3 shows that at least a portion of a wheel of the backhoe loader 110 may be positioned over ditch 140, as well. That is, the lateral translation of the backhoe loader 110 may allow the backhoe loader to reach positions and placements that may not be reached by driving on backhoe loader's wheels. This arrangement may have the further advantage of saving time by aligning the in-and-out scooping motion of bucket 150 (along the hinged stick and boom) with ditch 140, as shown in FIG. 3, which may aid in efficiency of excavation, ease of operation, or provide other advantages.

Loader 170 may rotate over (or slide across) the ground to accommodate the predominately sideways motion of the backhoe loader 110. This can be seen by the change in angle of the loader 170 relative to ditch 140, as shown between FIGS. 2 and 3.

Figure 4:
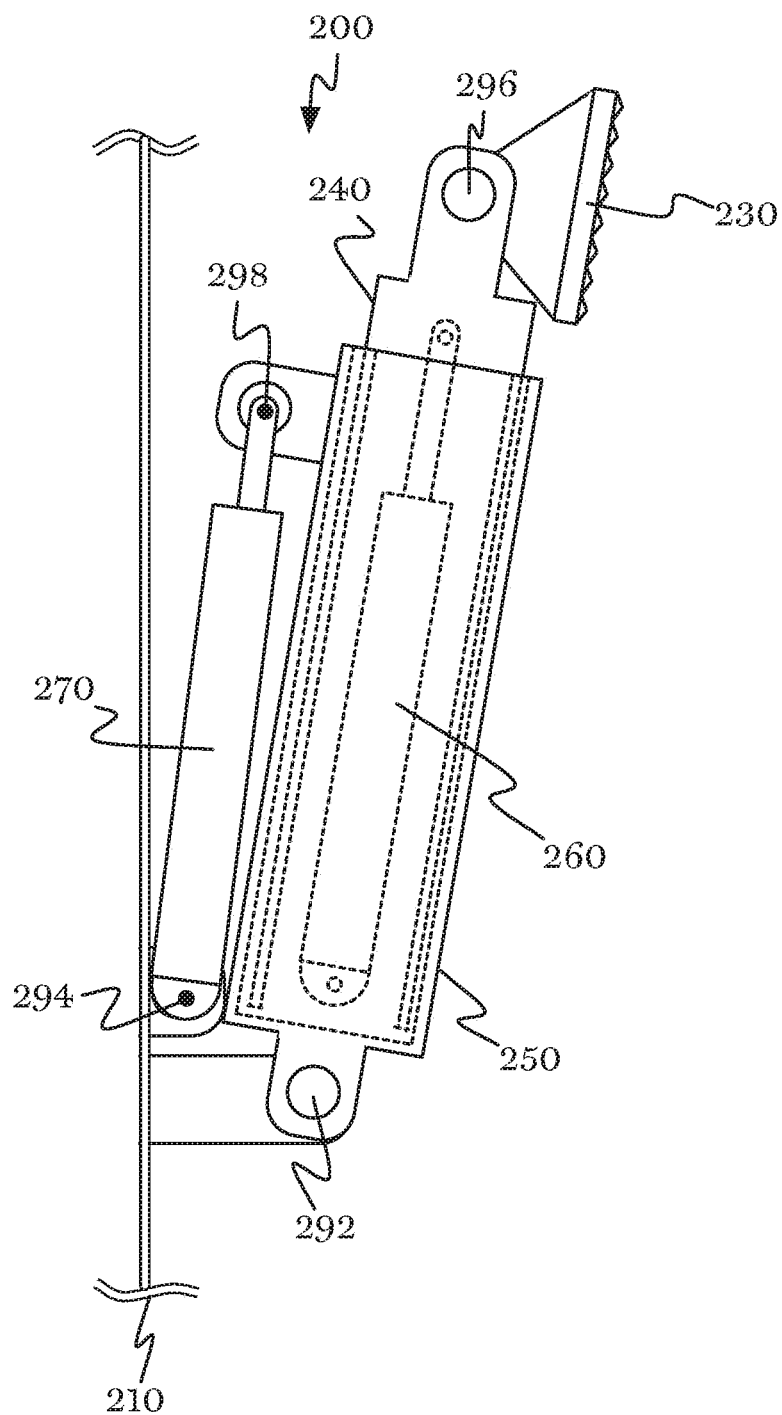
FIG. 4 shows a side view that illustrates the outrigger in the stowed, retracted position.
Figure 5:
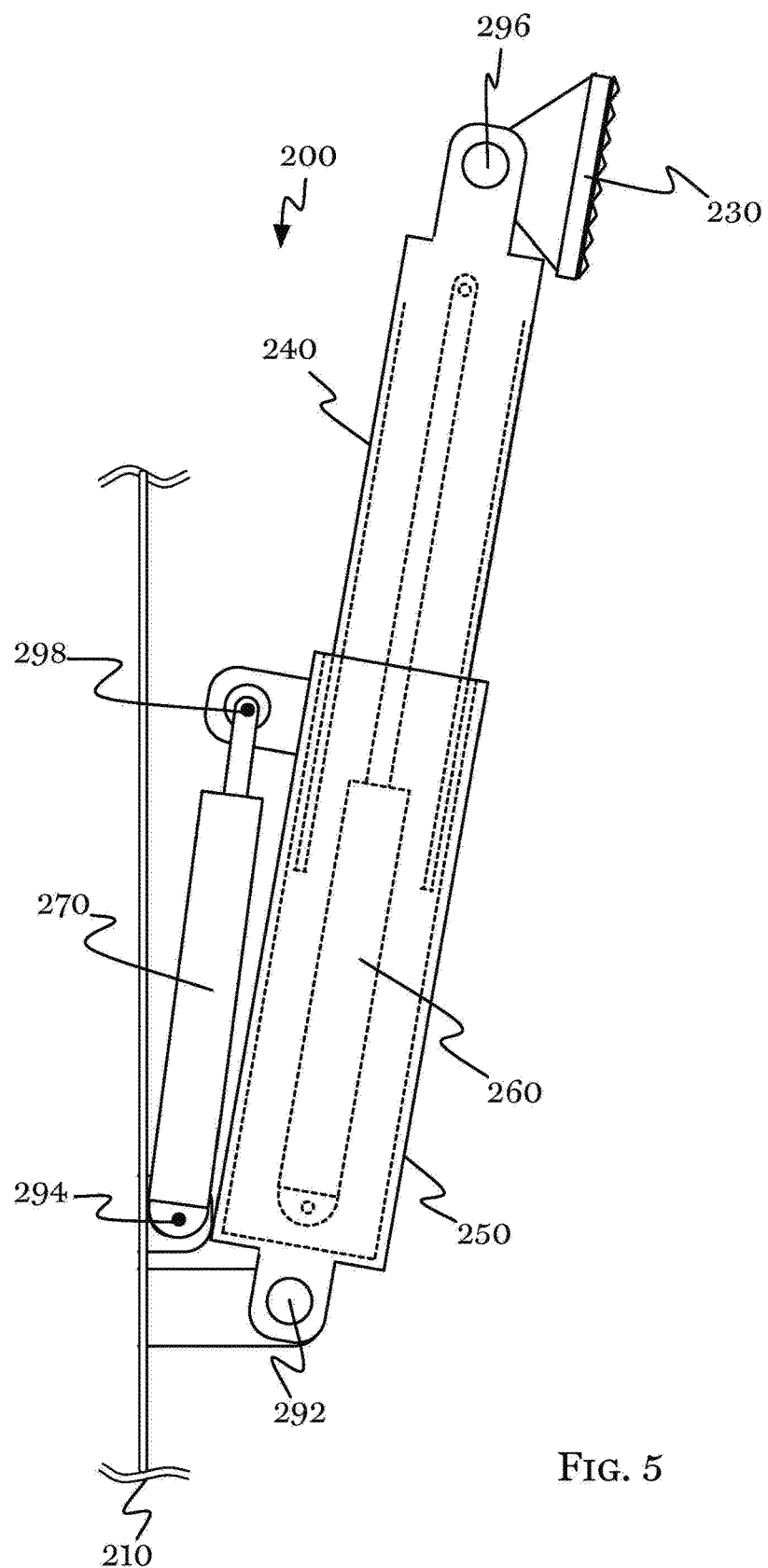
FIG. 5 shows a side view that illustrates the outrigger in the stowed, extended position.
Figure 6:
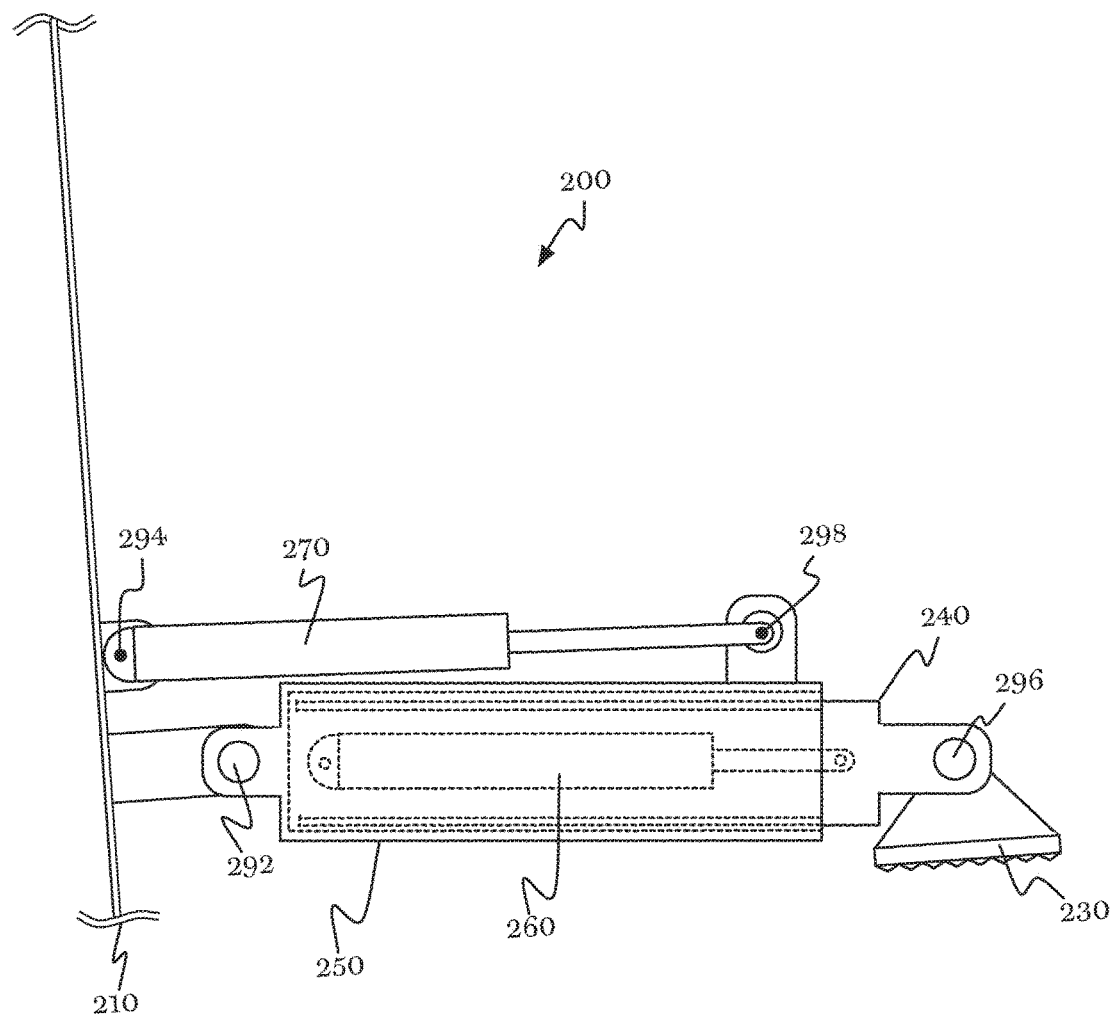
FIG. 6 shows a side view that illustrates the outrigger in the stabilizing, retracted position.
Figure 7:
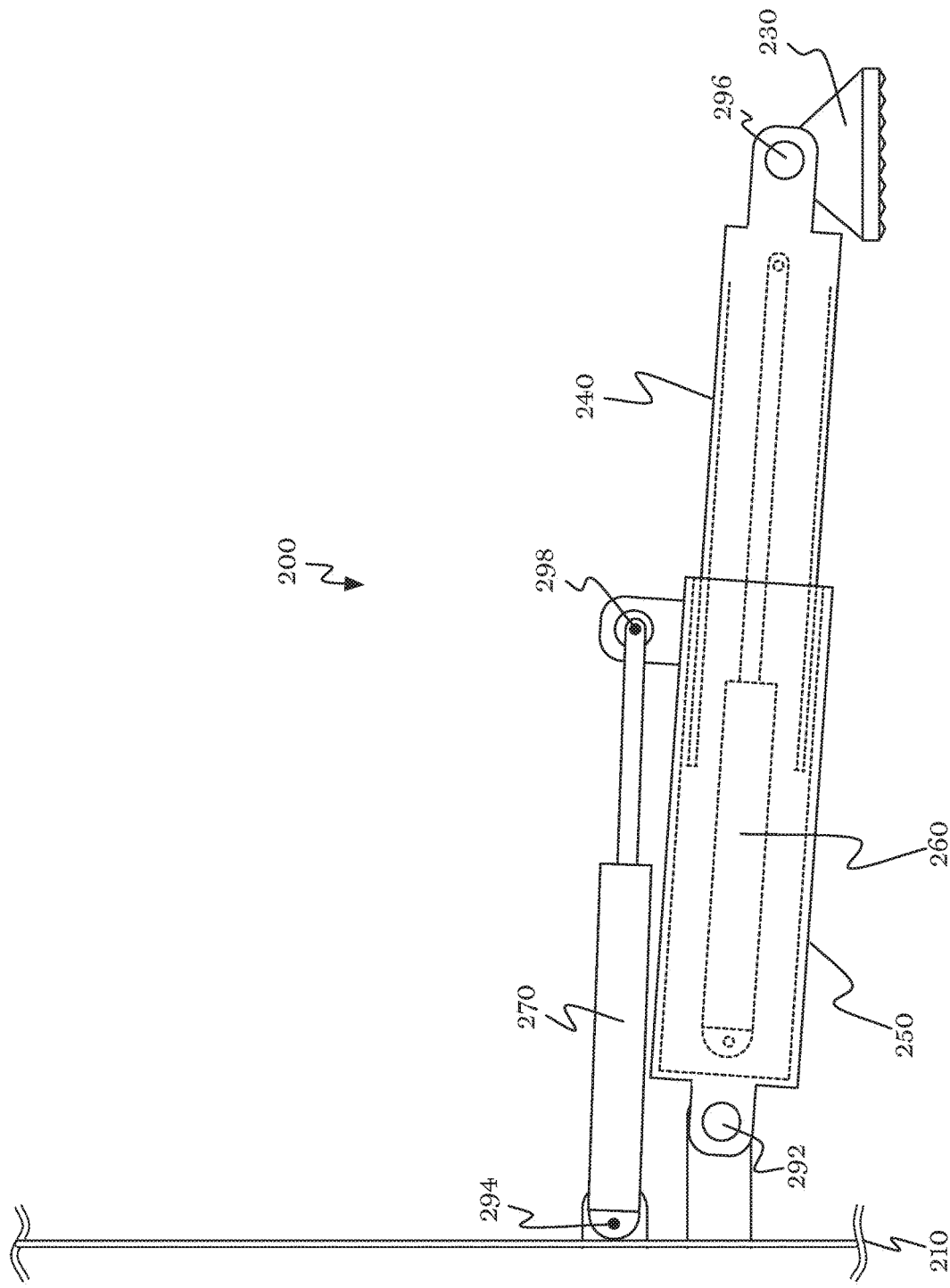
FIG. 7 shows a side view that illustrates the outrigger in the stabilized, extended position.

FIG. 4 shows a, side view that illustrates outrigger 200 in the stowed, retracted position. FIG. 5 shows a side view that illustrates outrigger 200 in the stowed, extended position. FIG. 6 shows a side view that illustrates outrigger 200 in the stabilizing, retracted position. FIG. 7 shows a side view that illustrates outrigger 200 in the stabilized, extended position.

Now, considering FIGS. 4, 5, 6, and 7 together, the various extreme (that is, fully-extended or fully-contracted) positions of outrigger 200 can be seen. Outrigger 200 connects to frame 210, as shown. The medial end of outrigger 200 pivotally connects to frame 210 at joint 292, as shown. The medial end of hydraulic cylinder 270 pivotally connects to frame 210 at joint 294, as shown. The distal end of hydraulic cylinder 270 pivotally connects to outrigger 200 at joint 298, as shown. This arrangement of joints 292, 294, and 298 with outrigger 200 and hydraulic cylinder 270 allows outrigger 200 to rotate between a stowage position and a stabilization position. These pivoting connections may be made by pins.

Outrigger 200 pivotally connects to shoe 230 at joint 296, as shown, which allows shoe 230 to engage the ground at a varying angle. This pivoting connection may be made by a pin. Alternately, the shoe may be fixedly connected to the outrigger.

Outrigger 200 includes external member 250 and internal member 240, as shown. External member 250 may be disposed around internal member 240 to allow internal member to slide in and out along the long axis. Hydraulic cylinder 260 may be disposed inside of internal member 240 and fixedly connected to the distal end, as shown. Hydraulic cylinder 260 may be disposed inside of external member 250 and fixedly connected to the medial end, as shown. The example arrangement of external member 250, internal member 240 and hydraulic cylinder 260 allows outrigger 200 to extend and retract, that is, it allows telescoping along the long axis of outrigger 200. The external member 250, internal member 240 and hydraulic cylinder 260 may be designed to be sufficient to overcome the forces generated during swinging, scooping and otherwise operating the bucket on the stick and boom, for example, selection of the materials and design may include factors such as modeling of mechanical forces, advances in materials technology, advances in hydraulics or fluid dynamics, economic considerations, etc.

The beams may be any type of slidably-mating beams, such as the mating cylinders shown in FIGS. 4, 5, 6, and 7 for external member 250 and internal member 240. Alternately, the external member and internal member may be reversed, with the internal member connected to the frame and the external member connected to the shoe. Further alternately, the hydraulic cylinder may be disposed along the outside of the outrigger. Yet further alternately, the members may be inter-mating in any fashion that allows sliding or extension/contraction along the long axis. In some embodiments, the joint between the stowage/stabilization cylinder and the outrigger may be desirable on the portion/beam/member that is immediately pivotally connected to the frame.

Figure 8:
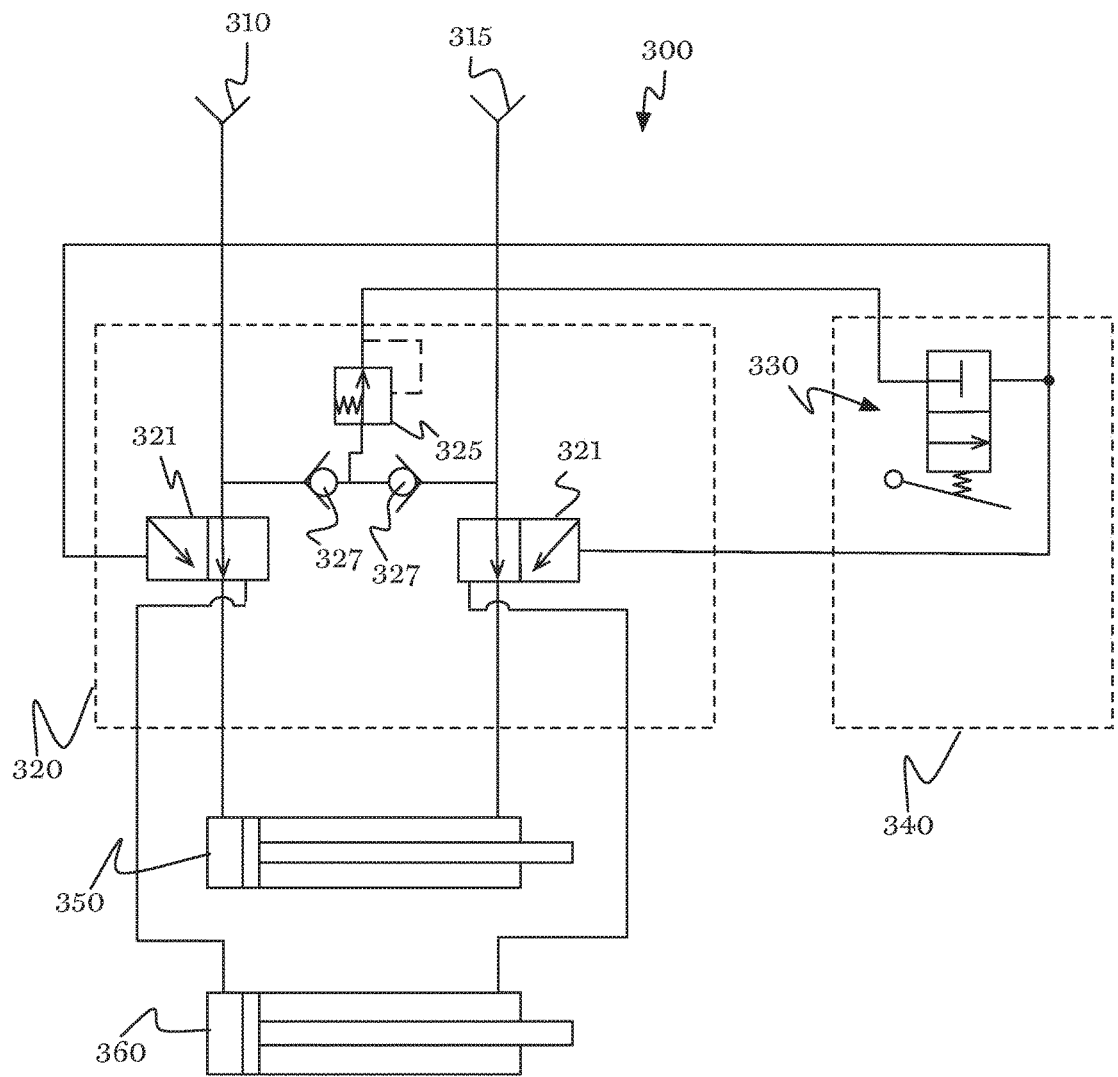
FIG. 8 shows a schematic view that illustrates a hydraulic circuit to retrofit pre-existing construction equipment with the telescoping outrigger.

FIG. 8 shows a schematic view that illustrates hydraulic circuit 300 to retrofit pre-existing construction equipment with a pair of telescoping outriggers. For pre-existing construction equipment, a kit may be provided to retrofit with telescoping outriggers. This kit may include two telescoping outriggers, of the type shown in FIGS. 4, 5, 6, and 7. The kit may include sufficient controls to operate the two new hydraulic cylinders, that is, control valve, lines, and manual valves for the placement in cab. The kit may include installation instructions (to describe the installation steps) and an operating manual (to describe operation of the telescoping outrigger after installation).

A kit may be sold as an aftermarket solution. Kits may be assembled using parts with appropriate dimensions for the make, model, and/or year of construction equipment. The outrigger may mount to the pre-existing machine frame pin bores. The outrigger arm may house a separate control valve, which would allow the telescoping circuit to be operated by the pre-existing stow/stabilize hydraulic circuit.

Installation may begin by removal of the original (non-telescoping) outrigger. The hydraulic cylinder (for stow/stabilize hydraulic circuit) may be left attached to the construction equipment. The new telescoping outrigger may be attached to the frame of the construction equipment, which includes a hydraulic cylinder for extend/retract hydraulic circuit. The extend/retract cylinder may be connected to the existing hydraulic circuit by modifying the circuit to function as shown in FIG. 8.

FIG. 8 shows a hydraulic circuit that permits use of the existing (stow/stabilize) hydraulic controls to alternate between controlling the pair of hydraulic cylinders that stow/stabilize and controlling the pair of hydraulic cylinders that extend/retract (telescope). The original hydraulic lines from head end 310 and rod end 315 of the stow/stabilize hydraulic circuit may be connected into the diverter valve 320, which may be the diverter valve provided with the telescoping outrigger as part of a kit.

Hydraulic oil may flow into diverter valve 320 from the head end 310 and rod end 315, as shown. Diverter valve 320 may contain control spools 321, double check valves 327, and pressure reducing valve 325, as shown. Upon activation of the hydraulic circuit, pilot oil can be produced through pressure reducing valve 325, as shown. Pilot oil may flow to control valves 330 located in cab 340.

Hydraulic fluid may be any suitable incompressible fluid, such as hydraulic oil. Control valves 330 are detented. When control valves 330 are in a normal position, control valves 330 would block oil and allow only operation of the stow/stabilize hydraulic circuit of the stow/stabilize hydraulic cylinder 350. This allows moving the telescoping outrigger between the stowed position and the stabilizing position.

In an example controller, when the operator would like to operate the telescoping hydraulic circuit, the operator would change the position of the detented control valves 330. The pilot oil from the control valves 330 would then travel back to diverter valve 320 allowing the position of spools 321 to re-direct the pump flow to the extend/retract hydraulic circuit of the telescoping cylinder 360.

In some embodiments, diverter valve 320 may be mounted within or upon the telescoping outrigger. In some embodiments, it may be preferable to provide quad check valves or multiple check valves to prevent movement of the stow/stabilize cylinder while the extend/retract hydraulic circuit is in use.

The hydraulic controller may be any suitable mechanical, pilot, or electro-hydraulic controls, such as the diverter valves shown in FIG. 8 as diverter valve 320.

For installations into new construction equipment, the original equipment manufacturer may include a control circuit as part of the original construction equipment. This control circuit would be operated from the cab by the operator and allow extension and retraction of the telescoping outriggers, either independently, or simultaneous (as desirable to create side-to-side movement described in FIGS. 2 and 3, above). These controls may be mechanical, pilot, or electro-hydraulic controls, or other types of controls.

Although Applicant has described Applicant's preferred embodiments of this invention, it will be understood that the broadest scope of this invention includes modifications and implementations apparent to those skilled in the art after reading the above specification and the below claims. Such scope is limited only by the below claims as read in connection with the above specification. Further, many other advantages of Applicant's invention will be apparent to those skilled in the art from the above descriptions and the below claims.

The invention claimed is:

1. A construction vehicle with a frame and an earth moving tool mounted on a stick and boom, the system comprising:
   a pair of stabilizing legs having leg distal ends;
   wherein the pair of stabilizing legs telescope between a retracted position and an extended position, whereby the retracted position locates the leg distal ends closer to the construction vehicle and the extended position locates the leg distal ends further from the construction vehicle;
   a first pair of hydraulic cylinders connected to the pair of stabilizing legs to power a telescopic movement of the pair of stabilizing legs between the retracted position and the extended position; and
   a controller, attached to the construction vehicle, to control the first pair of hydraulic cylinders to extend one of the first pair of hydraulic cylinders and to retract the other of the first pair of hydraulic cylinders to shift the construction vehicle laterally between the leg distal ends when the leg distal ends are engaged with the ground, thereby allowing substantially lateral movement of the construction vehicle while the pair of stabilizing legs are engaged with the ground.

2. The construction vehicle according to claim 1, wherein the pair of stabilizing legs are pivotally connected to the frame on substantially opposing sides of the frame, such that the pair of stabilizing legs pivot upwards to a stowed position close to the construction vehicle and pivot downwards to a stabilizing position where the leg distal ends engage the ground; and a second pair of hydraulic cylinders to connect to the pair of stabilizing legs to power a pivoting movement of the pair of stabilizing legs between the stowed position and the stabilizing position.

3. The construction vehicle of claim 2 wherein the construction vehicle includes a tractor mounted upon the frame to supply power to move the construction vehicle and to supply power to the first pair of hydraulic cylinders and the second pair of hydraulic cylinders.

4. The construction vehicle of claim 2 wherein the construction vehicle includes a tractor mounted upon the frame to supply power to move the construction vehicle and to supply power to the first pair of hydraulic cylinders and the second pair of hydraulic cylinders; and a loader bucket, pivotally attached to the frame, wherein the loader bucket is adapted to pivot downwardly to engage the ground to assist the pair of stabilizing legs with overcoming the forces of the earth moving tool scooping and swinging on the stick and boom during excavation.

5. The construction vehicle of claim 1 wherein the controller is attached to the construction vehicle, to control the first pair of hydraulic cylinders by extending and retracting one of the first pair of hydraulic cylinders independently of the other of the first pair of hydraulic cylinders.

6. The construction vehicle of claim 1 wherein the pair of stabilizing legs are adapted to overcome the forces of the earth moving tool scooping and swinging on the stick and boom during excavation.

7. The construction vehicle of claim 1 wherein the frame includes a right side and a left side, and wherein one of the pair of stabilizing legs is connected to the right side of the frame, and one of the leg distal ends engages the ground on the right side of the frame.

8. The construction vehicle of claim 1 further comprising:
wherein the construction vehicle includes a loader bucket, pivotally attached to the frame, wherein the loader bucket is adapted to pivot downwardly to engage the ground to assist the pair of stabilizing legs with overcoming the forces of the earth moving tool scooping and swinging on the stick and boom during excavation.

9. A construction vehicle comprising: a system to stabilize the construction vehicle, which has a frame with a tractor mounted on the frame, comprising:

a stabilizing leg with a ground-engaging shoe;
wherein the stabilizing leg telescopes between a retracted position and an extended position, whereby the retracted position locates the ground-engaging shoe closer to the frame and the extended position locates the ground-engaging shoe further from the frame;
a hydraulic cylinder connected to the stabilizing leg to power a telescopic movement of the stabilizing leg between the retracted position and the extended position;
a backhoe bucket, mounted on a stick and boom, pivotally attached to the frame, wherein the stabilizing leg is adapted to overcome the forces of the backhoe bucket scooping and swinging on the stick and boom during excavation; and a controller, attached to the construction vehicle, to control the hydraulic cylinder to extend and to retract the ground-engaging shoe, wherein the system is configured to shift the construction vehicle laterally towards the ground-engaging shoe, when the ground-engaging shoe is engaged with the ground, thereby allowing substantially lateral movement of the construction vehicle while the stabilizing leg is engaged with the ground.

10. The construction vehicle of claim 9, wherein the stabilizing leg is pivotally connected to the frame, such that the stabilizing leg pivots upwards to a stowed position and pivots downwards to a stabilizing position where the ground-engaging shoe engages the ground; and a second hydraulic cylinder connected to the stabilizing leg to power a pivoting movement of the stabilizing leg between the stowed position and the stabilizing position.

11. The construction vehicle of claim 10 wherein the controller is attached to the construction vehicle, to control the hydraulic cylinder to extend and to retract the ground-engaging shoe;
the system further comprising a second controller, attached to the construction vehicle, to control the second hydraulic cylinder to stow and to stabilize the stabilizing leg; and a loader bucket, pivotally attached to the frame, wherein the loader bucket is adapted to pivot downwardly to engage the ground to assist the stabilizing leg with overcoming the forces of the backhoe bucket scooping and swinging on the stick and boom during excavation.

12. The construction vehicle of claim 9 wherein the stabilizing leg is connected to the same side of the frame as the ground-engaging shoe engages the ground.

13. The construction vehicle of claim 12 further comprising: a loader bucket, pivotally attached to the frame, wherein the loader bucket is adapted to pivot downwardly to engage the ground to assist the stabilizing leg with overcoming the forces of the backhoe bucket scooping and swinging on the stick and boom during excavation.

14. The construction vehicle of claim 10 further comprising: a second controller, attached to the construction vehicle, to control the second hydraulic cylinder to stow and to stabilize the stabilizing leg.

15. A kit, to retrofit a construction vehicle with a frame and an existing hydraulic circuit for existing stabilizing legs, comprising:

a pair of replacement stabilizing legs having leg distal ends adapted to engaged with the ground and support the construction vehicle;
wherein the pair of replacement stabilizing legs telescope between a retracted position and an extended position, whereby the retracted position locates the leg distal ends closer to the construction vehicle and the extended position locates the leg distal ends further from the construction vehicle;
a pair of hydraulic cylinders connected to the pair of replacement stabilizing legs to power a telescopic movement of the pair of replacement stabilizing legs between the retracted position and the extended position;
a diverter valve to divert hydraulic fluid from the existing hydraulic circuit to the pair of hydraulic cylinders; and a controller to control a flow of hydraulic fluid between the existing hydraulic circuit and the diverter valve to control the pair of hydraulic cylinders to extend one of the pair of hydraulic cylinders and to retract the other of the pair of hydraulic cylinders to shift the construction vehicle laterally between the leg distal ends when the leg distal ends are engaged with the ground, thereby allowing substantially lateral movement of the construction vehicle while the pair of replacement stabilizing legs are engaged with the ground to support the construction vehicle.

16. The kit of claim 15, wherein the pair of replacement stabilizing legs are configured and arranged to pivotally connect to the frame on substantially opposing sides of the frame, such that the pair of replacement stabilizing legs pivot upwards to a stowed position close to the construction vehicle and pivot downwards to a stabilizing position where the leg distal ends engage the ground; and a second pair of hydraulic cylinders to connect to the pair of replacement stabilizing legs to power a pivoting movement of the pair of replacement stabilizing legs between the stowed position and the stabilizing position.

17. The kit of claim 15 further comprising:

a manual to provide instruction to operate the telescopic movement of the pair of replacement stabilizing legs using the controller.

18. The kit of claim 15 further comprising:

an instruction manual to provide instruction to attach the pair of replacement stabilizing legs to the construction vehicle and to provide instruction to connect the diverter valve to the existing hydraulic circuit.

19. The kit of claim 15 further comprising:

an instruction manual to provide instruction to attach the pair of replacement stabilizing legs to the construction vehicle and to provide instruction to connect the diverter valve and the controller to the existing hydraulic circuit.

* * * * *